May 11, 1954  F. R. VONDERHEIDE  2,678,106
MECHANISM FOR SELECTIVE OR COMBINED CONTROL OF
FRONT AND REAR WHEEL HYDRAULIC DRIVE MOTORS
Filed Sept. 9, 1949  4 Sheets-Sheet 1
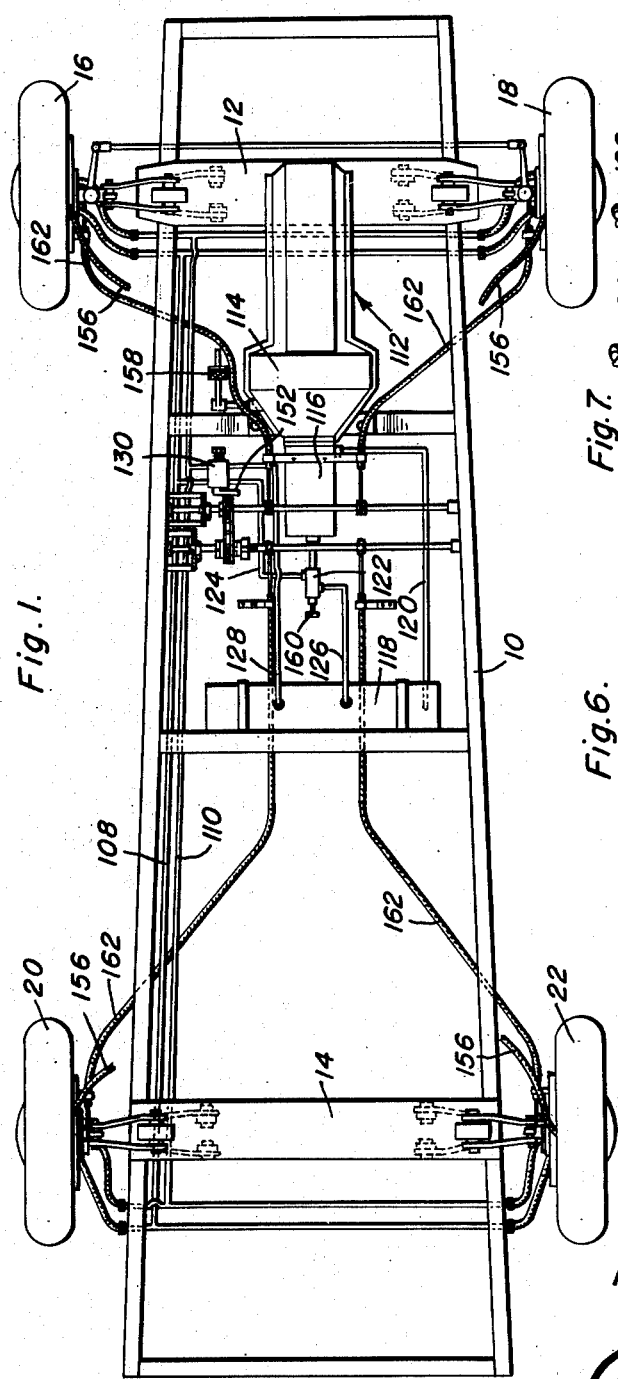
Fig.1.
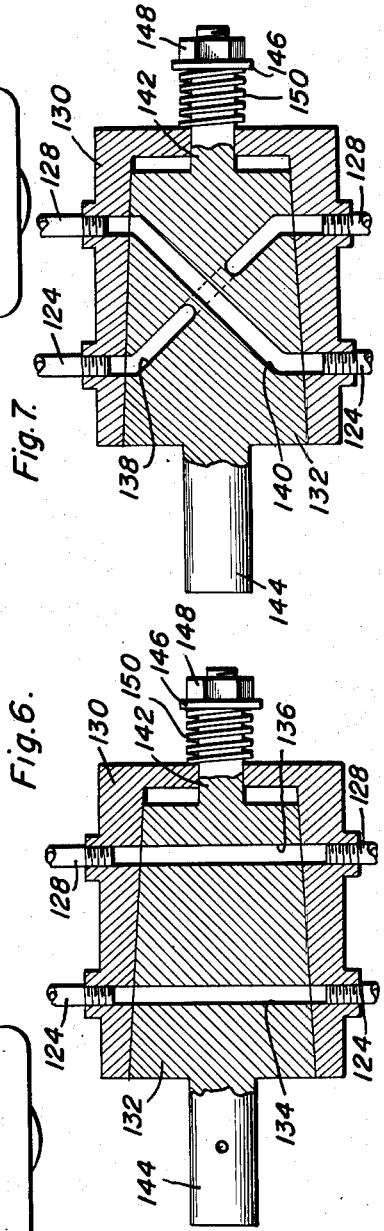
Fig.7.
Fig.6.
Inventor
Frank R. Vonderheide
By Clarence A. O'Brien
and Harvey B. Jacobson
Attorneys

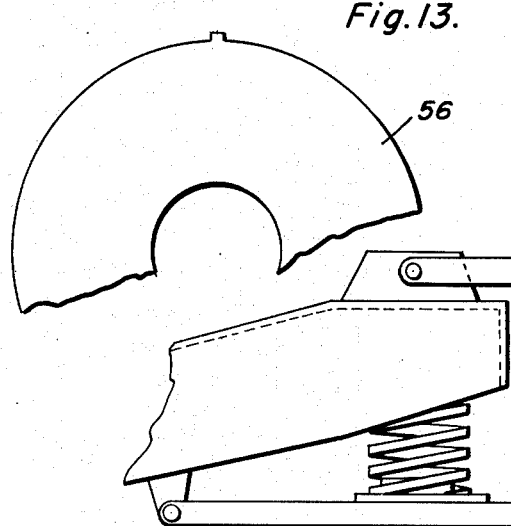
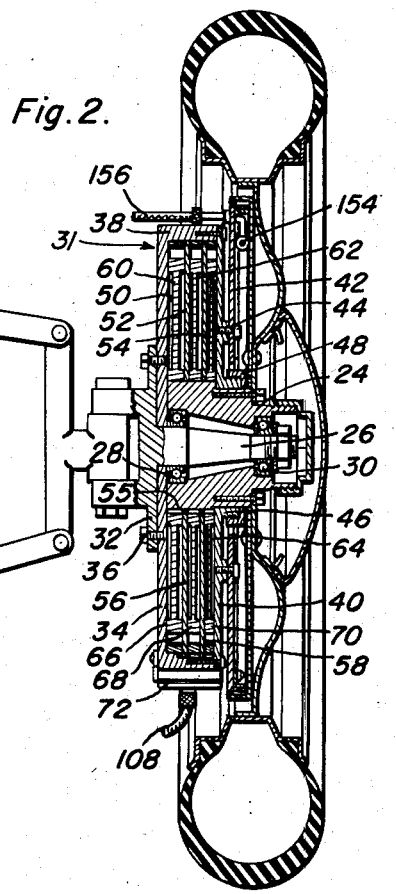
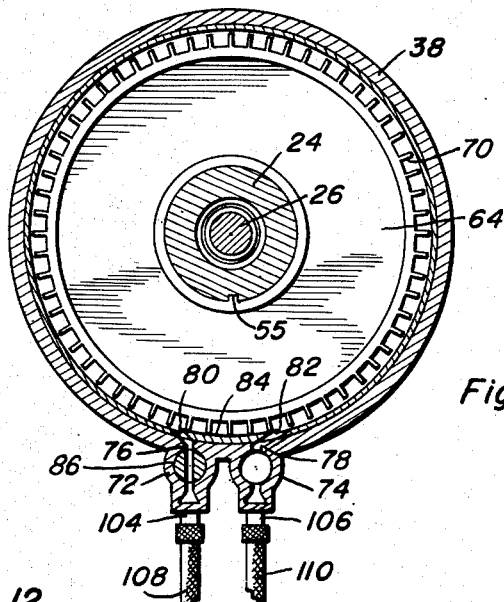
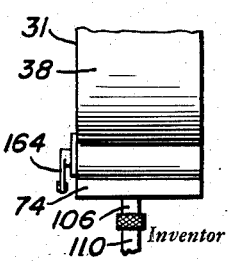
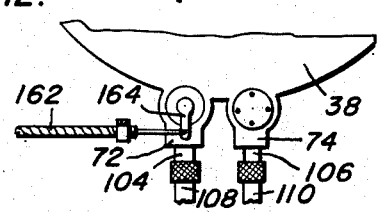
Frank R. Vonderheide

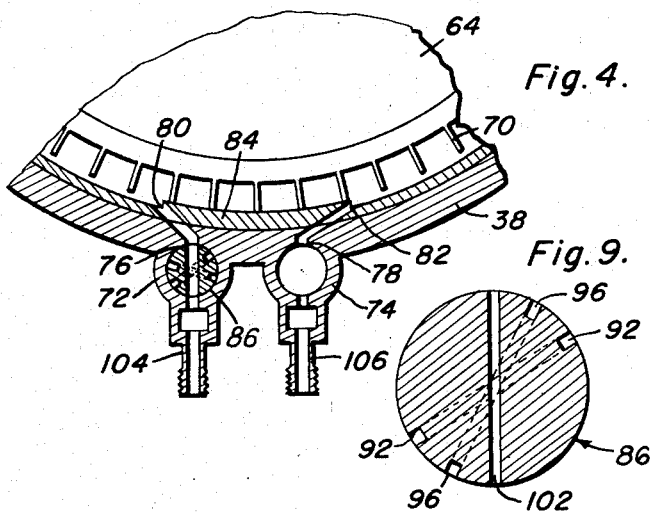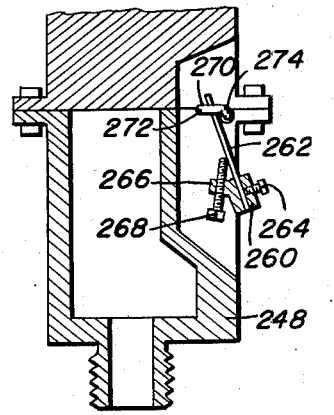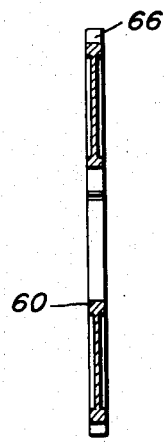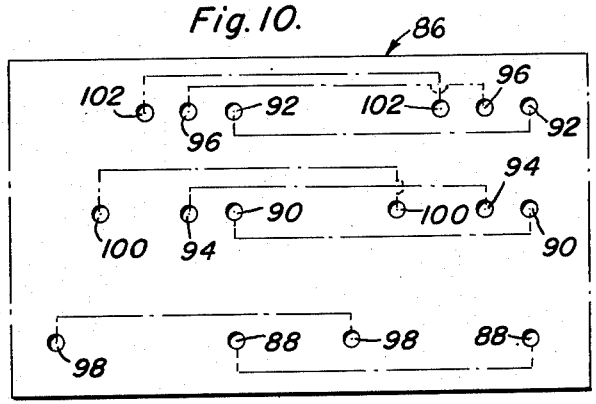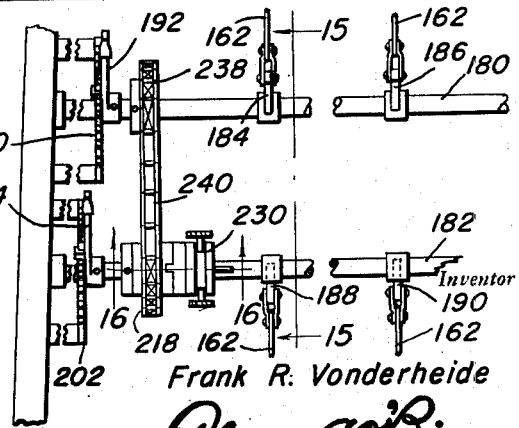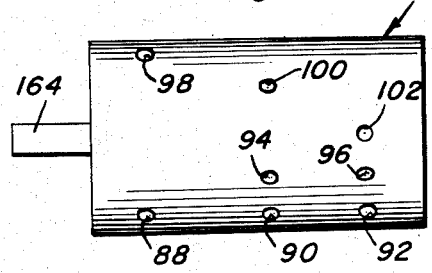

May 11, 1954   F. R. VONDERHEIDE   2,678,106
MECHANISM FOR SELECTIVE OR COMBINED CONTROL OF
FRONT AND REAR WHEEL HYDRAULIC DRIVE MOTORS
Filed Sept. 9, 1949   4 Sheets-Sheet 4

Frank R. Vonderheide
INVENTOR.

BY
Attorneys

Patented May 11, 1954

2,678,106

UNITED STATES PATENT OFFICE 2,678,106

MECHANISM FOR SELECTIVE OR COMBINED CONTROL OF FRONT AND REAR WHEEL HYDRAULIC DRIVE MOTORS

Frank R. Vonderheide, Joliet, Ill.

Application September 9, 1949, Serial No. 114,828

3 Claims. (Cl. 180—66)

This invention relates to new and useful improvements in hydraulically actuated drives and the primary object of the present invention is to provide a variable speed, reverse and forward hydraulic drive for vehicles that will eliminate the necessity of having to provide for a differential and clutch mechanism on a vehicle.

Another important object of the present invention is to provide a hydraulic drive including a wheel structure, a plurality of hydraulically actuated rotors for driving the wheel and embodying a novel and improved valve whereby a fluid under pressure may rotate all of the rotors simultaneously, a pair of the rotors or a selected one of the rotors for varying the rotary speed of the wheel.

Yet another object of the present invention is the provision of a variable speed, reverse and forward hydraulic drive that is incorporated with each wheel of a vehicle to permit instant movement of the vehicle in either a forward or rear direction.

A further object of the present invention is to provide a vehicle having wheels that are hydraulically driven in either a forward or rear direction and including a valve operating means for each wheel that is mounted on the instrument panel of the vehicle in a conveniently accessible position for a driver.

Still another object of the present invention is the provision of a hydraulic drive by which the front and rear wheels of a vehicle may separately or jointly be driven.

A still further aim of the present invention is to provide a variable speed, reverse and forward hydraulic drive for vehicles that is simple and practical in construction, strong and reliable in use, small and compact in structure, neat and attractive in appearance, efficient and durable in operation, safe and convenient in handling, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a diagrammatic view of the present invention;

Figure 2 is an enlarged fragmentary view of one wheel constructed in accordance with the present invention;

Figure 3 is a fragmentary view of one wheel of the present invention, showing the manner in which fluid under pressure is supplied to the wheel driving rotors;

Figure 4 is an enlarged fragmentary view of Figure 3;

Figure 5 is a sectional view of one of the rotors used in conjunction with the present invention;

Figure 6 is a longitudinal sectional view of the forward and reverse control valve used in conjunction with the present invention in position for permitting the wheels to be driven forwardly;

Figure 7 is a longitudinal sectional view of the forward and reverse control valve rotated to a position for permitting the wheels to be driven rearwardly;

Figure 8 is an elevational view of one of the speed control valves used in conjunction with the present invention;

Figure 9 is a transverse sectional view of the valve shown in Figure 8;

Figure 10 is a diagrammatic view of one of the speed control valves;

Figure 11 is a fragmentary elevational view of the rotor housing, details of construction of which are shown in Figure 2, illustrating the valve actuating crank and pipe connection;

Figure 12 is a side elevational view of Figure 11;

Figure 13 is a fragmentary elevational view of one of the partition plates used in conjunction with the present invention;

Figure 14 is a fragmentary plan view of the valve actuating mechanism that is utilized in conjunction with the present invention;

Figure 19 is an enlarged vertical sectional view taken substantially on the plane of section line 19—19 of Figure 18.

Figure 17:
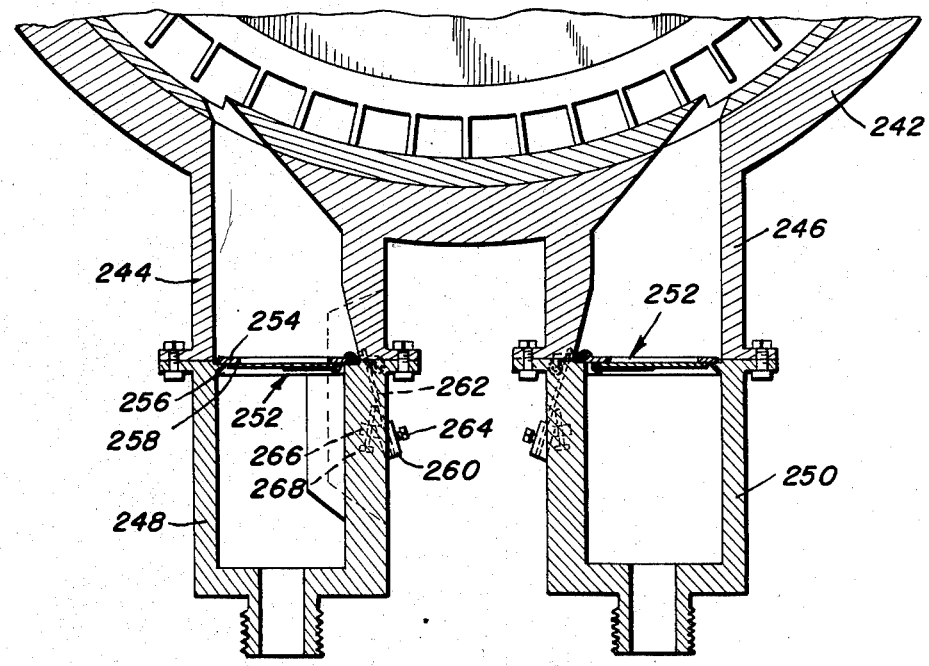
Figure 17 is a fragmentary vertical sectional view of the wheel speed control unit with the valve members in modified form.

Referring now to the drawings in detail, wherein, for the purpose of illustration, there is disclosed a preferred embodiment of the present invention, the numeral 10 represents a vehicle frame or chassis having forward and rear cross members or wheel mountings 12 and 14.

A pair of forward wheels 16 and 18 are associated with the forward cross-member 12 and a pair of rear wheels 20 and 22 are associated with the rear cross member 14. The wheels are all constructed similarly and each of the wheels is provided with a hub portion 24 that is secured to a stub axle 26 through the medium of bearings 28 and 30 whereby the wheels may rotate freely upon their supporting axles.

The axles supporting the wheels include base plates 32 to which are detachably secured rotor housings 31, each having an inner ring member or wall 34 by fasteners 36. The ring members 34 are interposed between the base plates 32 and the hub portions 24 and include flanges 38 that are removably secured to outer ring members or walls 40. The ring members 34 and 40 together with the flanges 38 constitute housings that are held stationary with respect to the wheels, and the inner ring members are detachably secured to the wheel cylinder supporting walls 42 of the wheels by further fasteners 44.

It is thus observed that there is a housing associated with each wheel, and each of the housings is composed of the ring members 34 and 42 with a flange 38. The housings are tightly sealed and, to further prevent the passage of a fluid from the housings, threaded collars 46, integrally formed with the outer ring members 40 and embracing the hub portions, are threaded to packing glands or sealing rings 48.

Each of the aforementioned housings is divided into preferably three chambers 50, 52 and 54 by partition rings 56 and 58. The outer circumferences of the partition rings 56 and 58 are suitably keyed to the inner peripheries of the flange portions 38 and are spaced with respect to each other and the ring members 34 and 40 so that the chamber 50 is the largest of the three members and the chamber 54 is the smallest of the three chambers.

Keyed, as at 55, to the outer periphery of each hub portion 24 are three ring type rotors or impellers 60, 62 and 64 that are disposed in the respective chambers 50, 52 and 54. It should be noted that the rotor 60 is the wider of the three rotors and the rotor 64 is the narrower of the three rotors. The rotors 60, 62 and 64 are provided with circumferentially spaced, radially disposed blades, vanes or impeller fingers 66, 68 and 70, respectively, on their outer circumferences. The blades 66 on the rotor 60 are larger in area than the blades 68 and 70, and the blades 70 are smaller in area than the blades 66 or 68.

A pair of casings 72 and 74 are integrally formed with the flanges 38 of each of the housings and include longitudinal slots or openings 76 and 78 that communicate with spaced parallel slots or ports 80 and 82 provided in the flanges 38. The ports 80 and 82 communicate with the chambers 50, 52 and 54 and the inner peripheries of the flanges 38 between the slots 80 and 82 are increased in thickness, as at 84, to provide very little clearance between the rotor blades and the flanges 38.

The numeral 86 represents a cylindrical valve having a first group of transverse or diametrical passages or ports 88, 90 and 92; a second group of transverse or diametrical passages or ports 94 and 96; another transverse or diametrical port or passage 98; a further transverse or diametrical passage or port 100; and a still further transverse or diametrical port or passage 102. The ports 88, 90 and 92 are disposed in one plane passing through the longitudinal axis of the valve 86 and which plane is circumferentially spaced relative to planes passing through the other ports. Similarly, the ports 94 and 96 are disposed in one longitudinal axis plane as are each of the ports 98, 100 and 102, with all of the planes being circumferentially spaced relative to each other. The ports 92, 96 and 102 lie in a transverse plane perpendicular to the longitudinal axis of the valve 86; the ports 90, 94 and 100 lie in a transverse plane perpendicular to the longitudinal axis of the valve 86 and spaced parallel to a plane through the ports 92, 96 and 102; and the ports 88 and 98 lie in a transverse plane perpendicular to the longitudinal axis of the valve 86 and spaced parallel to planes through the ports 90, 94 and 92, 96, 102, respectively.

Of the casings 72 and 74, only the casings 72 are provided with a valve 86. The casings 72 are provided with combined inlet and outlet nipples 104 and the casings 74 with similar nipples 106. The nipples 104 and 106 are connected, respectively, to pipe lines 108 and 110.

Mounted upon the frame 10 adjacent the forward wheels 16 and 18 is a power unit 112 consisting of an engine 114 and pump 116 operated by the engine 114. The intake side of the pump 116 is connected to a reservoir 118, mounted on the frame 10, by an inlet line or conduit 120, and the outlet side of the pump 116 is provided with a valve housing 122 from which there extends a pair of pipe sections 124 and 126. The pipe section 124 is connected to the pipe line 108 and the pipe section 126 extends to the reservoir 118. A further pipe section 128 extends from the reservoir 118 and is connected to the pipe line 110.

A main control valve housing 130 is interposed in the pipe sections 124 and 128. A barrel valve 132 is mounted in the housing 130 for rotation and includes a pair of spaced parallel transverse or diametrical ports or passages 134 and 136 that will communicate with the pipe sections 124 and 128 when the wheels are to be rotated for moving the frame forwardly (see Fig. 6), and a pair of non-intersecting cross-passages or ports 138 and 140 that will communicate with pipe sections 124 and 128 on opposite sides of the housing 130 when the wheels are to be rotated for moving the frame 10 rearwardly (see Fig. 7).

The valve 132 includes trunnions 142 and 144 at each end and the trunnion 142 extends outwardly of the housing 132 and is threaded to receive a washer 146 and nut 148. A coil spring 150 embraces the trunnion 142 and is biased between the washer 146 and the housing 130 to yieldingly retain the valve 132 in a selected rotated position. The trunnion or reduced end portion 144 of the valve 132 is attached to a handle or grip 152 that is mounted close to an operator so that the same may be manually actuated in a convenient manner.

Each of the wheels is provided with a wheel cylinder or hydraulically actuated brake operator 154 of conventional and well known construction and the operators 154 are connected by conduits 156 to the power unit 112 so that, as the brake pedal 158 of the power unit 112 is depressed, a braking action of the wheels will occur. A relief valve 160 is provided so that if the fluid pressure leaving the pump is too large for the lines 108 and 110, some of the pressure will be reduced by entering the reservoir.

Means is provided for rotating the valves 86 and this means comprises flexible cables 162 that are secured to cranks 164 mounted on the valves 86 and which cables extend to a position conveniently accessible to an operator of the vehicle. The cables 162 of the rear wheels and the forward wheels may be actuated simultaneously or individually by independent levers or a single lever to activate the valves 86 singly or combined.

In practical use of the present invention, for moving the vehicle or frame 10 forwardly, the engine 114 is started (by a push button or starter pedal) and the speed is controlled by the driver. Valve 132 is disposed with the ports 134 and 136 in communication with the pipe line 124 and 126 (Fig. 6). Fluid pumped through line 108 by the pump 116 will enter the rotor housings by way of valve housings 72 to rotate the rotors and drive the wheels forwardly and fluid within the rotor chambers will pass therefrom and into the pipe line 110 by way of the casings 74.

The forward speed of the wheels is governed by the valves 86 so that all rotors 60, 62 and 64 will rotate, the rotors 62 and 64 will rotate, or a selected one of the rotors will rotate. The ports 88, 90 and 92 are arranged in alignment to simultaneously register with the port 80 and thereby communicate, respectively, with the rotor chambers 50, 52 and 54. In this position of the valve 86, maximum power is developed at each wheel and corresponds to the "low" gear position in conventional vehicle drives. Similarly, rotation of the valve 86 whereby the ports 94 and 96 register with the port 80 effects communication of fluid flow to the chambers 52 and 54 which corresponds to "second" gear position. Further rotation of the valve 86 to effect a register of port 102 with rotor chamber 54 corresponds to "high" gear position. If desired, fluid flow to chamber 52 only or to chamber 50 only is accomplished by rotating valve 86 for registry of port 100 with port 80 or registry of port 98 with port 80.

For movement of the wheels in a rearward direction, the valve 132 is rotated manually so that the portions 138 and 140 communicate with the lines 124 and 126 to reverse the flow of fluid through the lines 108 and 110. Fluid will then enter the chambers 50, 52 and 54 by way of the casings 74 and will leave the casings by way of the casings 72.

Reference is next directed to Figures 1, 14, 15 and 16 wherein there is disclosed the hand operated control mechanism for the valves 86 so that the speed of rear wheels and forward wheels can be controlled independently or collectively. This control mechanism includes a pair of spaced parallel forward and rear shafts 180 and 182 that are journaled for rotation on the forward portion of the frame 10 and rearwardly of the forward wheels 16 and 18.

A pair of laterally projecting arms 184 and 186 are suitably secured to the forward shaft 180 and are fixed to the cables 162 leading to the valves 86 in the casings 72 of the forward rotor housings. Laterally projecting arms 188 and 190 are also fixed to the rear shaft 182 and are secured to the cables 162 leading to the valve 86 mounted in the casings 72 of the rear rotor housings.

Hand levers 192 and 194 are suitably secured to the shafts 180 and 182, respectively, and these hand levers support slidable locking dogs or pawls 196 and 198 that will engage arcuately spaced notches 200 and 202 provided in ratchets 204 and 206 that are secured to the frame 10 to retain the shafts 180 and 182 in a selected rotated position. It should be noted that the notches 200 and 202 are so arranged and placed in complemental relationship to the valves 86 so that a selected group of ports in the valves 86 will register with the openings 80 as the shafts are locked in selected rotated positions.

Spring-urged hand grips 208 and 210 are pivoted to the levers 192, 194 and are connected to the pawls 196, 198 by pitmans or links 212 and 214 whereby the pawls will be normally urged to their locking engagement with the ratchets 204, 206. A holding ring 216 is pivoted to the lever 194 and is manually moved to embrace the hand grip 210 to hold the hand grip 210 depressed and the pawl 198 out of locking engagement with the ratchet 206 when the shafts 180 and 182 are to be rotated together in a manner later to be described.

A clutch mechanism (see Fig. 16) is provided so that both the shafts 180 and 182 can be rotated together or whereby the shafts 180 and 182 may be rotated independently. This clutch mechanism comprises a drive sprocket 218 that is loosely journaled on the shaft 182 by inner and outer rings 220 and 222. The rings 220 and 222 are suitably secured to the shaft 182 and the drive sprocket 218 is provided with an annular flange 224 on its inner face that embraces the ring 220. Circumferentially spaced clutch teeth 226 are formed on the flange 224 for engagement with clutch teeth 228 provided on the inner face of a clutch ring 230 that is slidably mounted on and rotatable with the shaft 182.

The lower bifurcated end 232 of a hand operated clutch lever 234 is pivoted to the clutch ring 230 and the lever 234 is pivoted intermediate its ends to a suitable bracket 236 mounted on the frame 10 or the ratchet 206.

The drive sprocket 218 is connected to a driven sprocket 238, fixed on the shaft 180, by an endless drive chain 240. When the ring 216 is placed over the hand grip 210 and the clutch teeth 228 are interdigitated with the clutch teeth 226, a movement of the lever 192 will cause a rotation of both shafts 180 and 182 and when the pawl 196 engages a selected one of the notches 220, both the shafts 180 and 182 will be locked against rotation with the valves 86 in the casings 72 of both the forward and rear rotor housings simultaneously adjusted.

By disengaging the clutch teeth 228 with the clutch teeth 226 and releasing the ring 216 from the hand grip 210, the shafts 180 and 182 can be rotated independently to regulate the speed of rotation of the forward wheels and the rear wheels.

Figure 18:
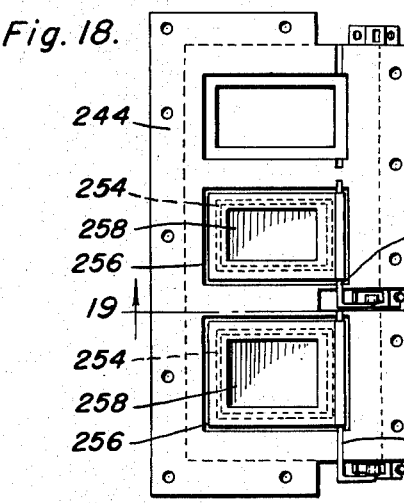
Figure 18 is a reduced bottom plan view of Figure 17 to show one of the valve casings and with parts removed for the convenience of explanation.
Figure 15:
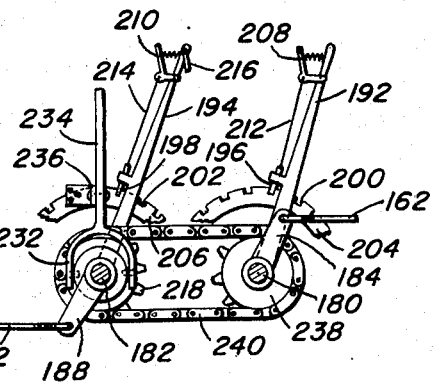
Figure 15 is a vertical sectional view taken substantially on the plane of section line 15—15 of Figure 14.
Figure 16:
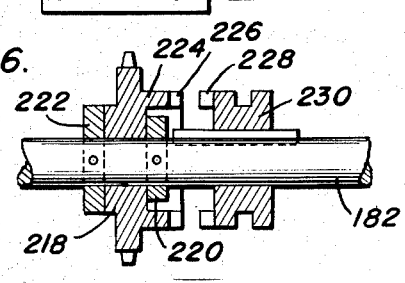
Figure 16 is an enlarged vertical sectional view taken substantially on the plane of section line 16—16 of Figure 14.

Attention is now directed to Figures 17, 18 and 19, wherein there is disclosed the valve means for the rotor housings in slightly modified form. In this embodiment, the rotor housings will be referred to by the numeral 242. The rotor housings 242 are similar to those previously described and include valve casings having upper sections 244, 246 and lower sections 248, 250. The lower sections 248, 250 are detachably secured to the upper sections.

The upper and lower sections 244, 248 and the upper and lower sections 246, 250 are each divided into three compartments communicating with the chambers 50, 52 and 54. A valve member 252 is disposed in the compartments communicating with the chambers 50 and 52 and the valve members consist of substantially rectangular flap valves 254 that are hinged to the lower sections and which are supported on ribs 256 in the lower sections when the valves 254 are in their closed positions. Pivoted to the under surfaces of the valve 254 are further flap valves 258 that are spring urged upwardly to close the openings in the valves 254.

Under a predetermined pressure entering the casing sections 248, 250 both valves 254, 258 in a selected compartment will swing upwardly, whereas when a downward pressure is applied to the valve members 252 of a selected compartment, the valves 258 will pivot downwardly.

Means is provided whereby the valve members 252 controlling the larger two of the rotor compartments (50, 52) will be actuated by a predetermined fluid pressure. This means consists of lugs 260 that are secured to the sections and which slidably support resilient strips 262. The strips 262 are held in adjusted position by set screws 264 carried by the lugs 260. Ears 266 integrally formed with the lugs adjustably receive screws 268 that will bear against the strip 262 to bow the strips and these screws 268 form fulcrums for the strips 262.

The pivot pins 270 for the valve members 252 are provided with angulated ends 272 supporting rollers 274 that ride against the strips 262.

In this latest embodiment of the valve means, no control mechanism is required, since the fluid pressure in the lines 108 and 110 will be such as to actuate the valves 252 under a predetermined pressure, the fluid pressure in the conduits 108 and 110 being controlled by the speed of the power unit and the operator of the power unit. The forward and rear movement of the vehicle is controlled by the valve 132.

Obviously, a valve member such as 252 could be applied to the compartments in the sections 244, 248 and 246, 250 communicating with the chamber 54. Also, valves such as 86 could be applied to the casings 74 if a more precise reverse speed control is required.

Having described the invention, what is claimed as new is:

1. A hydraulic drive device for vehicles comprising forward and rear drive housings, rotors in said housings, means for introducing a flow of fluid into said housings, valve means with each of said housings for controlling the flow of fluid thereto, a pair of rotatable shafts, one of said shafts being operatively connected to the valve means associated with the forward of said housings and the other of said shafts being operatively connected to the valve means associated with the rear of said housings, means connecting the shafts for co-rotation, and other means for selectively disconnecting said connecting means for independent rotation of said shafts.

2. A hydraulic drive device for vehicles comprising forward and rear drive housings, rotors in said housings, means for introducing a flow of fluid into said housings, valve means with each of said housings for controlling the flow of fluid thereto, a pair of rotatable shafts, one of said shafts being operatively connected to the valve means associated with the forward of said housings and the other of said shafts being operatively connected to the valve means associated with the rear of said housings, sprocket and chain means connecting said shafts for co-rotation, clutch means for disconnecting said shafts, and other means for individually and separately rotating said shafts.

3. A hydraulic drive device for vehicles comprising drive housings for the front and rear wheels of a vehicle, rotors in said housings, means for introducing a flow of fluid into said housings, a valve for each housing for controlling the flow of fluid thereto, a first rotatable shaft operatively connected to and for actuating each valve of a front wheel housing, a second rotatable shaft operatively connected to and for actuating each valve of a rear wheel housing, and means for selectively locking said shafts for co-rotation.

References Cited in the file of this patent

UNITED STATES PATENTS

| Number | Name | Date |
|---|---|---|
| 1,036,743 | Sundh | Aug. 27, 1912 |
| 1,043,480 | Sundh | Nov. 5, 1912 |
| 1,156,818 | Rich | Oct. 12, 1915 |
| 1,349,924 | Swanson | Aug. 17, 1920 |
| 1,426,902 | Noel et al. | Aug. 22, 1922 |
| 1,930,032 | Apple | Oct. 10, 1933 |
| 1,987,698 | Montelius | Jan. 15, 1935 |
| 2,257,108 | Cornwell | Sept. 30, 1941 |
| 2,355,604 | Rupp | Aug. 15, 1944 |
| 2,381,109 | Cartlidge | Aug. 7, 1945 |

OTHER REFERENCES

"The American Inventor," April 1906, page 101.